May 16, 1967 L. S. TRIMBLE 3,320,523
METHOD FOR VISIBLY INDICATING AND RECORDING MAGNETIC FIELDS
Filed Feb. 1, 1965
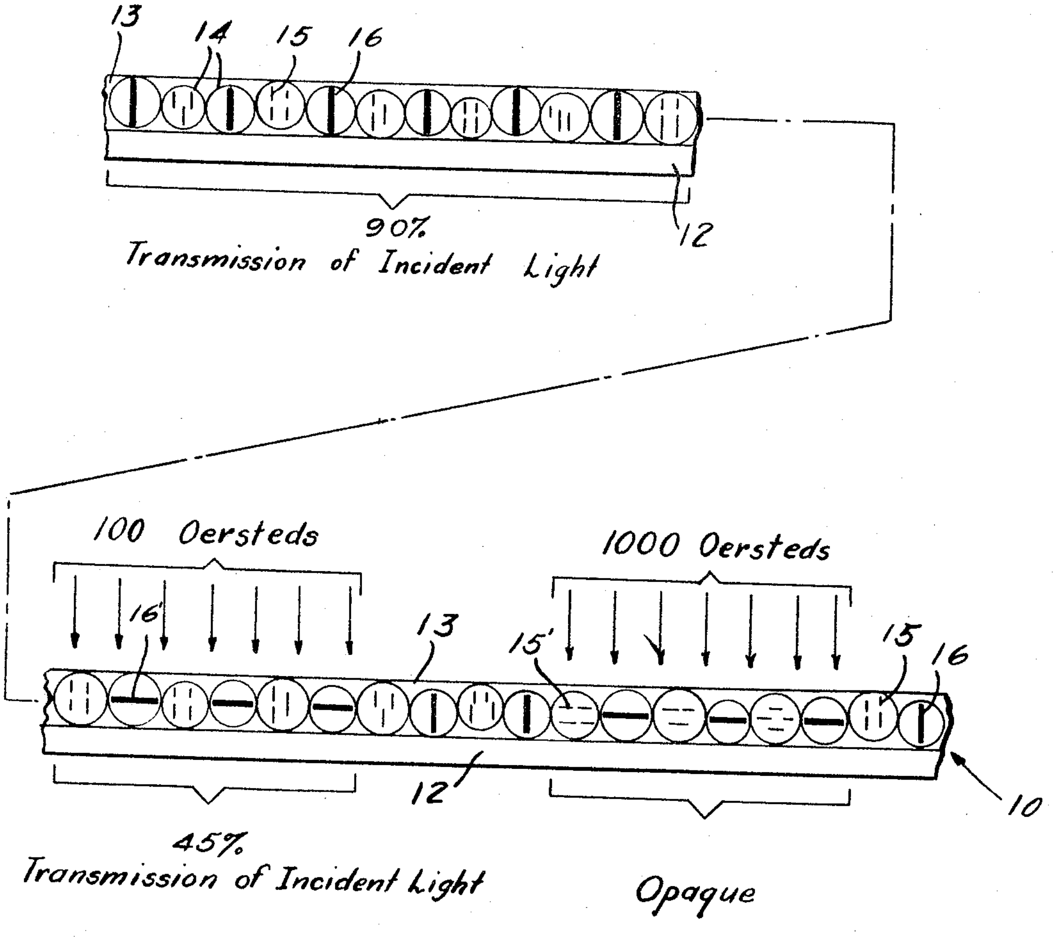
Inventor
Lyne S. Trimble
by Robert M. McManigal
Attorney 3,320,523
Patented May 16, 1967

3,320,523

METHOD FOR VISIBLY INDICATING AND RECORDING MAGNETIC FIELDS

Lyne S. Trimble, 4724 Arcola, North Hollywood, Calif. 91602

Filed Feb. 1, 1965, Ser. No. 429,447
3 Claims. (Cl. 324—43)

The present invention relates generally to means for and method of immediately indicating and visibly permanently recording a magnetic field.

Heretofore, one common practice for viewing magnetic fields involved the sprinkling of finely divided magnetic material upon a surface and then suspending the surface within the scope of the lines of flux believed to define the existence of the magnetic field. The detection of magnetic fields by this technique does not provide a permanent image and in the case of extremely weak fields requires the distribution and control of very tiny magnetic particles. When applied to magnetic recording tapes these particles become imbedded in the surface, thus providing an abrasive that will greatly increase wear on information recording and playback heads.

In addition to the above practice, a variety of measuring devices have also been used for indicating the presence of a magnetic field. For example, rapidly rotating conductors that cut lines of magnetic flux will indicate both the presence and the strength of a magnetic field. The Hall effect has been used also as a means of detecting magnetic fields and is the basis of commercial gauss meters. Since magnetic fields can deflect moving electrons, the application of magnetic fields to electron streams in cathode ray tubes has been used to provide a visual display on the face of the tube representing the presence of a magnetized area. Polarized electromagnetic energy can be used to visually observe magnetic domains or changes in magnetic domains in thin films. A discernible but not permanent image is available with this technique. Phosphor coatings applied to magnetized surfaces have been bombarded with electron beams. The magnetic field will deflect the impinging electrons to prevent a phosphor glow in the areas of magnetic information. For the display of magnetic fields on magnetic tapes, none of these techniques will permit the formation of a visible image coincident with the recording of information, nor will they provide a permanent image following recording. All of these techniques have an inherent drawback in that they depend upon the post-treatment of magnetized areas following the placement of information, and all of them provide images under transient viewing conditions requiring photographic or other documentation.

In contrast to the above methods and concepts, this invention utilizes a magnetic field to immediately position and align magnetic particles in such a fashion as to be productive of a permanent visual change in the area of the magnetic field. There is no pre-treatment, development, or post-treatment required. The field can be one that is in existence or one created by an electrical pulse. Image formation is accomplished by exposing to the magnetic field tiny particles of a size and shape that will allow a substantial change in light reflection or transmission by virtue of a 90° rotation. The tiny particles are suspended in a fluid and contained in small droplets incorporated in a resin coating. By magnetically aligning the particles so that maximum light transmission is obtained through the droplets, a direction of magnetic field can be chosen to cause a displacement and realignment of the particles essentially 90° from their initial position. If the particles have large flat surfaces in comparison with their thickness an effective light valve is available. In this manner a surface coating containing droplets of image forming particles will provide an immediately visible pattern in the presence of a magnetic field.

Although magnetic particles have been encapsulated in gelatin or gum arabic walled capsules, and these have been coated on a surface as a means of displaying the presence of a magnetic field, these approaches have a number of disadvantages. For example, the walls are water soluble and the only liquid that can be encapsulated is an oil. Since the gelatin or gum arabic walls must be tough enough so that the capsule can exist free of a support, they are somewhat opaque. As a result there is light absorption by both the walls and the oil. It has not been possible to prepare encapsulated products of this type under about 10 microns in diameter and obtain a visible pattern because of these optical effects. It is therefore one object of this invention to provide controlled characteristic water phase droplets rather than oil phase droplets, without any shell or wall between the droplet and a resin carrier layer. Only the water phase-resin interface exists.

It is a further object of the invention to provide for the formation of droplets much smaller than 10 microns in diameter.

Another object of the invention to control the refractive index of the water phase itself in order that optical problems are avoided, thus permitting much greater resolution by the alignment of the suspended particles.

Still other objects of the present invention broadly include:

(a) The provision of a means in which magnetic induction is utilized to change the positions of suspended particles and thereby produce a visual change in the area traversed by the magnetic field.

(b) Provision of a means for creating a visibly discernible area coincident with a magnetizing action which produces a magnetized area.

(c) The incorporation of selected and shaped magnetic particles in fluid droplets suspended in a relatively nonreactive continuous surface coating.

(d) The packaging of magnetic characteristics in a fluid droplet in such a manner that the droplets can be suspended in a resin coating and the size of the droplets can be controlled to establish image resolution in an applied coating.

(e) To obtain permanent visual images as the result of magnetic field stimulus.

(f) To obtain erasable visual images as the result of magnetic field stimulus.

(g) To obtain in a single coating layer permanent or erasable visible images as the result of magnetic field stimulus.

(h) To provide a coating that can be applied to a supporting medium, and which will disclose the presence of a magnetic field in existence at the time of application or which may be created later.

(i) Provision of means for making visually discernible, magnetic fields or field patterns existing at a measurable level in magnetic recording materials, whether such pattern be of digital nature, analogue nature, or merely discontinuous areas exhibiting magnetic fields.

(j) The application of coatings to magnetic recording materials capable of magnetic field stimulation to cause visible images to appear on or within such coatings.

(k) Provision of coating means for thin supporting media, which may be bonded to, and if necessary later removed from, surfaces believed to contain magnetic fields so that a visual image can be produced on or within the applied material, and which, if removed, can be separately inspected by either reflection or transmission viewing.

(l) Arrange for magnetic materials or magnetic areas of magnetic tape to align magnetic particles productive of a visual image in the area of the magnetic tape.

(m) The provision of a visible image in areas of magnetic fields where the visual density or image intensity is proportional to the intensity of the magnetic field.

(n) The provision of visual images of magnetic fields with a resolution equal to the magnetic recording resolution.

(o) The packaging of magnetic particles of selected shape and characteristics in fluid droplets to be suspended in a resin with the selection of refractive indices so that the fluid droplet becomes invisible.

(p) The packaging of tiny magnetic particles of selected shape and characteristics in a fluid droplet that can be suspended in a resin, the viscosity of the fluid droplet being so chosen that the particles move only under the influence of a magnetic field.

(q) The packaging of tiny magnetic particles of selected shape and characteristics in a fluid droplet that can be suspended in a resin, the fluid density being so chosen that the particles will not move except under the influence of a magnetic field.

(r) The packaging of tiny magnetic particles of selected shape and characteristics in fluid droplets that can be suspended in a resin, and mixing two such resin suspensions carrying fluid droplets containing magnetic particles of different qualities.

Further objects of the invention will be brought out in the following part of the specifications wherein detailed description is for the purpose of fully disclosing the invention without placing limitations thereon.

Referring to the accompanying drawing, which is for illustrative purposes only, the single view shows an enlarged (highly magnified) fragmentary portion of a composite tape structure embodying the features of the present invention, and schematically illustrates the responsive actions, therein upon being subjected to magnetic fields of different strengths.

Referring specifically to the drawings, the basic concept of the present invention has been embodied in a composite tape structure and generally indicated by the numeral 10.

Briefly, the tape structure is shown in the embodiment as including a conventional strip or supporting medium 12 of plastic or other suitable material that may or may not carry a magnetic recording material thereon such as the red oxide coating commonly used in magnetic recording tapes.

If a red oxide surface is employed, it can be coated with a layer of highly reflective material of the class including lead oxide and titanium dioxide. It has been found that a 2½ to 5 micron coating thickness is generally sufficient to provide coverage over the red oxide. The highly reflective coating layer, if used, is followed by a further coating layer 13 of approximately 15 microns in thickness of a resin medium which provides a carrier for minute water phase droplets 14. These droplets, shown as a single layer but which may be in two layers, comprise closely adjacent water phase spheres containing a fluid of selected physical characteristics in which a plurality of tiny magnetic particles, as indicated respectively by the numerals 15 and 16, are freely movable.

These magnetic particles will respond to the presence of a magnetic field and will be displaced in position so as to produce a visible pattern indicative of that magnetic field.

The particles 15 are of acicular shape and approximately .1 to 5 microns long. By the application of a transverse megnetic field these acicular shaped particles can be aligned so as to present a minimum obstructing area to the passage of light in a direction perpendicular to the resin coating surface. Under the influence of a properly directioned high level magnetic field these particles will be displaced in the fluid droplet by a change of position amounting to approximately 90° so that the length of acicular particle and its width will contribute to the absorption of light incident at right angles to the resin coating surface. The rotation of the tiny acicular particles to a position as shown at 15', under the influence of such a magnetic field, will thus provide a substantial change in the light transmission characteristics of the resin coating as indicated, for example, by the 1,000 oersted field. The alignment of the particles by the magnetic field will provide a permanent image by virtue of either the fluid droplet density or fluid droplet viscosity or both. The image will be permanent as long as the magnetic field exists and it will be permanent after the magnetic field is removed except that a transverse magnetic field of greater strength than the first applied magnetic field can cause the re-alignment of the tiny particles to destroy or erase the visible pattern. If the resin coating has been applied over a red oxide and highly reflective material coating, the erasing field must be strong enough to cause erasure of the recorded signals in the red oxide coating in order that the visible image will disappear. Conventional magnetic tape erasing heads are satisfactory for the complete erasure and removal of the visible pattern.

The magnetic particles 16 are essentially thin flat plates with a size almost equal to that of the droplet diameter. These particles can also be aligned by a transverse magnetic field to permit maximum light transmission through or reflection from the coating layer. In turn, they can be re-aligned by rotation through a 90° angle to a position as shown at 16' by a relatively weak magnetic recording field, for example, by the 100 oersted field which is not capable of influencing the acicular particles 15. This rotation in a weak magnetic recording field serves to block the transmission of light through the resin coating, or the reflection of light from the resin coating, in a manner similar to that described for the acicular shaped particles. The flat particles are also subject to rotation and visible image destruction under normal magnetic tape erasing conditions.

If desired, a further resin coating (not shown) of 2 to 5 microns in thickness may be applied over the coating layer as a protective measure. When very high resolution is required, individual coatings of the two types of droplets may be employed upon the same support medium. This allows the high resolution magnetic field to be most effective in creating a visual change at low field levels. The visual contrast is generally not as good with this double coating form.

With a tape structure, as described above, simultaneous magnetic recording and corresponding visible recordings can be simultaneously produced for different field strengths when the tape is moved past a recording head. Best resolution is obtained by positioning the recording head adjacent to the resin coating layer.

Having briefly described my invention in its broad concepts, the specific details pertaining to the various elements and the procedural steps in their fabrication and production will not be described.

The magnetic materials used for the particles 15 may comprise any one of a class of magnetic metals including iron, cobalt and nickel, as well as solid solutions of these metals. In addition it may comprise any one of the class of metal oxides formed by these metals, singly or in combination. Such combinations are often known as ferrites and have the general composition $MOFe_2O_3$ where M stands for Mn, Fe, Co, Ni, Zn, or combinations of these metals with or without oxygen in various proportions. These substances can be formed in one-tenth to five micron size range by precipitation from chemical baths, by crystal growth techniques, or the solids can be directly converted into powder form by any one of the following methods, such as filing, ball milling, melting and blowing out through a water jet, or dispersion through a plasma gun. If the finely divided magnetic particles approximate one to two microns in size, a final visual resolution approximating one thousand pulses per inch is available.

Best results have been obtained with acicular iron oxide particles having a relatively low magnetic permeability and comprising the magnetic oxide of iron $Fe_3O_4$, identified commercially by the C. K. Williams Company as IRN–100 which exhibits a permeability between substantially 50 and 500.

The flat plate like particles 16 may consist of any one of the materials described above, singly, or in combinations, if such material exhibits a very high magnetic permeability in comparison with the permeability of the $Fe_3O_4$. Best results have been obtained through the use of iron powder known to the trade as carbonyl iron which exhibits a permeability between substantially 40,000 and 50,000. This relatively high permeability iron powder, prepared by reduction from the carbonyl compound, is commercially available in spherical form and must be mechanically flattened before it is incorporated into the fluid droplets.

Whereas particles of IRN–100 can be prepared for fluid phase incorporation by simple ball milling to achieve both reduction in particle size and complete dispersion or wetting by the fluid carrier, the carbonyl iron particles must be flattened first by a rolling technique and then dispersed in the fluid carrier. Best results have been obtained by mechanically sieving the carbonyl iron to extract those particles less than one micron in size. The particles thus extracted are suspended in a rapidly evaporating organic solvent and sprayed onto a ground and polished metal plate in the manner of normal paint spraying techniques. When the solvent has evaporated the flat plates are put through a roller mill under sufficient pressure so that the tiny particles are flattened into circular, elliptical, or plate like shapes between one and five microns in cross section. These plates can be removed from the ground and polished surface with a wire brush and are then ready to be dispersed in the fluid carrier.

With the size and shape of the magnetic particles established, the coatings to display magnetic fields can be prepared. For that portion responding to relatively high magnetic field strengths, best results have been obtained by using IRN–100 iron oxide acicular shaped particles. The water phase portion of the resin coating is prepared by ball milling a mixture of 75% by weight of glycerin, 17% by weight of sucrose and 8% by weight of the IRN–100 oxide. The purpose of ball milling is to reduce the size of the IRN– particles and to obtain complete wetting and dispersion of these tiny particles in the water phase. Unless full dispersion is obtained, the metal particles will migrate into the resin carrier. Wetting agents are not helpful.

A resin coating that will display the presence of a magnetic field can be prepared by stirring together the ball milled water phase and an acrylic co-polymer such as vinyl chloride acetate, a combination of methyl methacrylate and ethyl methacrylate, or one of the commercially available products. For such purpose, I have used the commercial product Acryloid B–72 resin. Good suspensions have been obtained by stirring at 33,000 r.p.m. Likewise, good suspensions have been obtained by stirring at 1,725 r.p.m. but with enough power so that the stirrer blade action is not retarded during the five to ten minutes required to obtain a dispersion. The ease of forming a dispersion is greatly increased if the Acryloid solvent is methyl ethyl ketone rather than toluene normally supplied with the fluid resin. The solids ratio is 40% Acryloid B–72 to 60% by weight of methyl ethyl ketone. Best results have been obtained by stirring together 20 parts by weight of the water phase with 80 parts by weight of acrylic co-polymer resin. Droplet size is influenced by the viscosities of the two phases and the rate of agitation. Following preparation of the suspension at least ten to fifteen minutes should be allowed for air bubbles to break and to permit any heavy droplets to settle.

For that portion of the coating responding to relatively low magnetic field strengths, best results have been obtained using the flattened carbonyl iron particles. The preparation of the suspension of water phase droplets in the resin is conducted in essentially the same manner as described above except that a minimum amount of ball milling is required and the loading of carbonyl iron may be reduced to suit the need for sensitivity to low magnetic field levels.

Following preparation of the individual suspensions described above, the resins carrying the suspended droplets can be mixed together by stirring in any proportion desired. Best results have been obtained from a mixture of 50 parts by weight of each. It is likely during such procedure that a small percentage of the droplets will merge to form single droplets containing both types of particles. This will not, however, materially affect the operation and performance. An improvement in the visual coating quality can be obtained by matching the index of refraction of the water phase fluid, with that of the resin so as to render the droplets invisible. This can be readily accomplished by blending the constituents of the water phase droplets.

Coating can be achieved by conventional draw down, thin slit, or knife blade techniques.

When application is to be made to magnetic oxide tapes rather than to transparent tapes, a highly reflecting layer should be placed between the magnetic oxide surface and the resin coating in order that the visible pattern is clearly discernible. Best results have been obtained through the application of a thin layer of Fuller Plast, a product of the W.P. Fuller Paint Company. This is a white commercial plastic paint that is cured by the catalytic action of sulfuric acid. The coating dries in one minute at 170° Fahrenheit to a tough but flexible specular surface that not only provides maximum light reflection but acts as a seal preventing the Acryloid solvent from softening the magnetic oxide resin of certain instrumentation tapes. The coating techniques for the Fuller Plast are identical to those for the Acryloid resin except that, if a doctor blade type of coater is employed, the Fuller Plast will have to be thinned with a rapidly evaporating solvent in order that coatings on the order of 0.2 to 0.3 mil can be obtained. At this thickness, the coatings have ample hiding power to prevent light reflections from the dark oxide surface below the coating. The particles can be surface treated to improve visual contrast. To improve contrast against a white background pretreatment of particles in a commercial gun bluing solution is satisfactory. To improve contrast against a dark background treatment of particles in a commercial bright dip solution is satisfactory. Metal dying techniques will provide for color contrast viewing.

The thickness of the image forming resin coating applied on top of the white coat depends upon the droplet size. With 5–10 micron droplets, coatings thinner than four-tenths of a mil will require a protective top coating to prevent the droplets from breaking and the surface of the tape from becoming sticky. Coatings thicker than 0.0004 of an inch provide adequate protection for the water phase droplets. Best results have been obtained with 0.0006 to 0.0008 inch coatings. In this thickness range, the Acryloid is easily dried at 170° Fahrenheit in two minutes time.

The foregoing description of the uses, advantages and operations of this invention has been directed toward application on magnetic tape, however, it is to be understood that the invention is equally applicable to use on transparent or opaque materials not necessarily involving magnetic tape or reflection coatings.

Various modifications may suggest themselves to those skilled in the art without departing from the spirit of my invention, and hence, I do not wish to be restricted to the specific forms shown or uses mentioned, except to the extent indicated.

I claim:

1. The method of creating a visible pattern accurately portraying the existence of a magnetic field, which comprises the steps of:
   (a) forming tiny particles of magnetic materials in the size range one-tenth micron to five microns;
   (b) forming a water phase solution by mixing the tiny particles in the ratio of 8 parts by weight with 75 parts by weight of glycerin and 17 parts by weight of sucrose;
   (c) dispersing the particles in the water phase solution to render the particles thoroughly wet by the water phase;
   (d) forming a suspension of water phase droplets by stirring 20 parts by weight of the water phase with 80 parts by weight of acrylic co-polymer phase;
   (e) coating a supporting medium with a resin containing the water phase droplets to form a film of approximately 15 microns in thickness;
   (f) pre-aligning the position of the tiny particles by subjecting the medium and resin coating to a transverse magnetic field in excess of 1,000 oersteds; and
   (g) subjecting the film coating to a magnetic field.

2. The method according to claim 1 in which the acrylic co-polymer phase comprises a combination of methyl methacrylate and ethyl methacrylate.

3. The method according to claim 1 in which the acrylic co-polymer phase comprises vinyl chloride acetate co-polymer.

References Cited by the Examiner

UNITED STATES PATENTS

| | | | |
|---|---|---|---|
| 1,835,612 | 12/1931 | Pearson | 324—43 |
| 2,530,564 | 11/1950 | Blaney | 324—38 |
| 2,971,916 | 2/1961 | Schleicher et al. | 346—74 |
| 3,041,289 | 6/1962 | Katchen et al. | 252—62.5 |
| 3,042,616 | 7/1962 | Brown | 252—62.5 |
| 3,097,522 | 7/1963 | Weller | 88—61 |
| 3,181,059 | 4/1965 | Mohnkern | 324—38 |
| 3,221,315 | 11/1965 | Brown et al. | 346—74 |
| 3,239,753 | 3/1966 | Arnold | 324—43 |

FOREIGN PATENTS 439,324 12/1935 Great Britain.

OTHER REFERENCES

The NCR Factory News, October 1959, The National Cash Register Co., Dayton 9, Ohio, pp. 14, 15, and 16.

RUDOLPH V. ROLINEC, *Primary Examiner.*

WALTER L. CARLSON, RICHARD B. WILKINSON, *Examiners.*

R. J. CORCORAN, *Assistant Examiner.*